(12) United States Patent
Yumiki

(10) Patent No.: US 8,139,140 B2
(45) Date of Patent: Mar. 20, 2012

(54) IMAGING DEVICE

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/420,949

(22) Filed: Apr. 9, 2009

(65) Prior Publication Data

US 2009/0256951 A1    Oct. 15, 2009

(30) Foreign Application Priority Data

Apr. 11, 2008 (JP) .................. 2008-103190

(51) Int. Cl.
*G03B 13/00* (2006.01)
*G03B 7/00* (2006.01)
*G03B 3/00* (2006.01)
*H04N 5/238* (2006.01)

(52) U.S. Cl. .......... 348/345; 348/353; 348/363; 396/64; 396/82; 396/102; 396/104; 396/237

(58) Field of Classification Search .................. 348/345, 348/349, 353, 363; 396/80, 82, 102–104, 396/237, 509, 64

See application file for complete search history.

(56) References Cited

U.S. PATENT DOCUMENTS

2008/0080747 A1* 4/2008 Takagi ..................... 382/118

FOREIGN PATENT DOCUMENTS

| JP | 08-279950 | 10/1996 |
| JP | 2001-125173 | 5/2001 |
| JP | 2001-203928 | 7/2001 |

* cited by examiner

*Primary Examiner* — Rochelle-Ann J Blackman
(74) *Attorney, Agent, or Firm* — Panasonic Patent Center; Dhiren Odedra; Kerry Culpepper

(57) ABSTRACT

A digital camera has an optical system, an image capturing unit, an aperture adjuster, a focal point adjuster, and a body microcomputer. The aperture adjuster has an aperture included in the optical system and is capable of adjusting the state of the aperture. The focal point adjuster has a focus lens included in the optical system and is capable adjusting the focal state of the optical system by using the focus lens by contrast detection method. The body microcomputer controls the operation of the aperture adjuster so that the aperture value of the optical system will be at or below a set aperture value before the focal state is adjusted by the focal point adjuster.

19 Claims, 13 Drawing Sheets

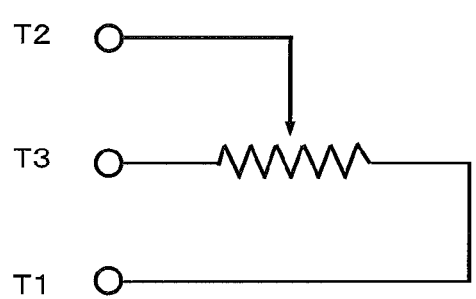
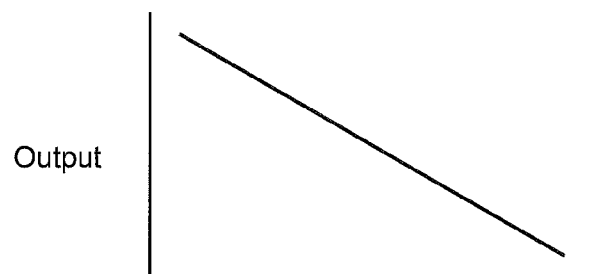
Fig. 8A
Fig. 8B

IMAGING DEVICE

CROSS-REFERENCE TO RELATED APPLICATIONS

This application claims priority to Japanese Patent Application No. JP 2008-103190 filed on Apr. 11, 2008. The entire disclosure of Japanese Patent Application No. JP 2008-103190 is hereby incorporated herein by reference.

BACKGROUND

1. Technical Field

The technical field relates to an imaging device, and more particularly to an image capturing unit having an aperture value update function.

2. Description of the Related Art

Digital cameras and other such imaging devices have exploded in popularity in recent years. One type of digital camera is the digital single lens reflex camera. When a subject is viewed through the optical viewfinder of this digital single lens reflex camera, the light incident on the optical system (that is, the subject image) is reflected by a reflecting mirror disposed along the optical path, and is guided to the viewfinder optical system. As a result, the subject image is converted by a pentaprism or the like into an erect image, and the user can see the subject image formed by the optical system through the optical viewfinder.

Meanwhile, when the optical system is used to capture an image, the reflecting mirror is retracted from the imaging optical path. As a result, the viewfinder optical path is changed to the imaging optical path, and upon completion of the imaging, the reflecting mirror is instantly returned to its home position. With a single-lens reflex camera, this operation is the same regardless of whether the camera is a conventional silver halide camera or a digital camera.

However, imaging with an optical viewfinder is extremely difficult for novices who lack experience with digital camera photography.

In view of this, an imaging device has been proposed that has a monitor imaging mode (known as a live-view imaging mode) that allows the subject to be viewed on a liquid crystal monitor during imaging (see, for example, Japanese Laid-Open Patent Application 2001-125173).

This type of imaging device generally has an aperture value update function. In the monitor imaging mode, real-time images sequentially captured at a set aperture value are displayed on a display device. Accordingly, the subject field depth, which varies with the aperture value, can be confirmed through the display device.

However, when the aperture value is large, generally the subject field depth is greater and there is a relatively larger sharp portion within the image. Accordingly, with a contrast detection method in which an image signal is used to adjust the focal point, it is more difficult to designate the peak contrast value, and there is the risk that focal point adjustment will be less accurate. There is a need for an imaging device with which stable focal point adjustment is possible regardless of the aperture value prior to imaging.

Also, when images of various aperture value are checked, it is easier to confirm differences between images due to differences in aperture values when the image is in focus, but no such technique has yet been proposed.

SUMMARY

It is an object to stabilize focal point adjustment in an imaging device having an aperture value update function.

It is another object to improve convenience in an imaging device having an aperture value update function.

An imaging device according to a first aspect is an imaging device that produces an image of a subject, comprising an optical system, an image capturing unit, an aperture adjuster, a focal point adjuster, and a controller. The optical system forms an optical image of the subject. The image capturing unit converts the optical image into an image signal. The aperture adjuster has an aperture included in the optical system and is capable of adjusting the state of the aperture. The focal point adjuster has a focus lens included in the optical system and is capable of adjusting the focal state of the optical system by using a focus lens by contrast detection method. The controller controls the operation of the aperture adjuster so that the aperture value of the optical system will be at or below a set aperture value before the focal state is adjusted by the focal point adjuster.

With this imaging device, since the aperture value is adjusted to be at or below the set aperture value before the focal state of the optical image is adjusted by the focal point adjuster, if the set aperture value is relatively small, for example, the subject field depth will be shallow when focal point adjustment is performed by contrast detection method. Since the contrast is higher when the subject field depth is shallower, the precision of auto focusing by contrast detection method is higher. Consequently, stable focal point adjustment is possible regardless of the aperture value prior to focal point adjustment.

The imaging device could be a device capable of capturing both still and moving images, a device capable of capturing just still images, or a device capable of capturing just moving images. Examples of imaging devices include digital single lens reflex cameras, digital still cameras, digital video cameras, portable telephones with a camera function, PDAs (Personal Digital Assistants) with a camera function, PCs (Personal Computers) with a camera function, and other such devices having an aperture value update function. The controller is a microprocessor installed in a digital camera, for example. At least part of the function of the image capturing unit, the aperture adjuster, and the focal point adjuster can be borne by the microprocessor.

An imaging device according to a second aspect is the imaging device according to the first aspect, wherein the controller controls the operation of the aperture adjuster so that after the adjustment of the focal state by the focal point adjuster, the aperture value of the optical system returns to a first aperture value from before the focal state is adjusted by the focal point adjuster.

An imaging device according to a third aspect is the imaging device of the second aspect, wherein the controller controls the operation of the aperture adjuster so that the first aperture value is compared with the set aperture value before the focal state is adjusted by the focal point adjuster, and if the first aperture value is greater than the set aperture value, the aperture value of the optical system will be at or below the set aperture value.

An imaging device according to a fourth aspect is the imaging device of any one of the first to third aspects, wherein the set aperture value is the minimum aperture value for the optical system.

An imaging device according to a fifth aspect is the imaging device of any one of the first to fourth aspects, further comprising a focal point adjustment operating unit configured to receive the input of focal point adjustment information for starting focal point adjustment. The controller starts control of the operation of the focal point adjuster so that the aperture value of the optical system will be at or below the set aperture value, on the basis of the focal point adjustment information inputted to the focal point adjustment operating unit.

An example of the focal point adjustment operating unit here is a two-stage release button or other push button. An example of the "input of focal point adjustment information" is pressing the release button half way down.

The imaging device according to a sixth aspect is the imaging device of any one of the first to fifth aspects, further comprising a display unit and a mode operating unit. The display unit displays an image of the subject on the basis of the image signal. The mode operating unit receives the input of mode information for starting a depth-of-field preview mode, which is a mode in which the state of the aperture can be adjusted in a state in which the image is displayed on the display unit. The focal point adjuster starts adjusting the focal state on the basis of the mode information inputted to the mode operating unit.

The imaging device according to a seventh aspect is an imaging device that produces an image of a subject, comprising an optical system, an image capturing unit, an aperture adjuster, a focal point adjuster, a display unit, and a mode operating unit. The optical system forms an optical image of the subject. The image capturing unit converts the optical image into an image signal. The aperture adjuster has an aperture included in the optical system and is capable of adjusting the state of the aperture. The focal point adjuster has a focus lens included in the optical system and is capable of adjusting the focal state of the optical system by using the focus lens by a contrast detection method. The display unit displays an image of the subject on the basis of the image signal. The mode operating unit receives the input of mode information for starting a depth-of-field preview mode, which is a mode in which the state of the aperture can be adjusted in a state in which the image is displayed on the display unit. The focal point adjuster starts adjusting the focal state on the basis of the mode information inputted to the mode operating unit.

With this imaging device, since the focal state is adjusted after the start of the depth-of-field preview mode, the subject field depth can be checked using an image that is more or less in focus. Consequently, it is easier to confirm a difference between images due to a difference in aperture value, so the device is more convenient to use.

BRIEF DESCRIPTION OF DRAWINGS

Referring now to the attached drawings which form a part of this original disclosure:

FIG. 8A is a diagram of the circuit configuration of an aperture linear sensor;

FIG. 8B is a graph of the aperture linear sensor characteristics;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

1: Overall Configuration of Digital Camera

Figure 1:
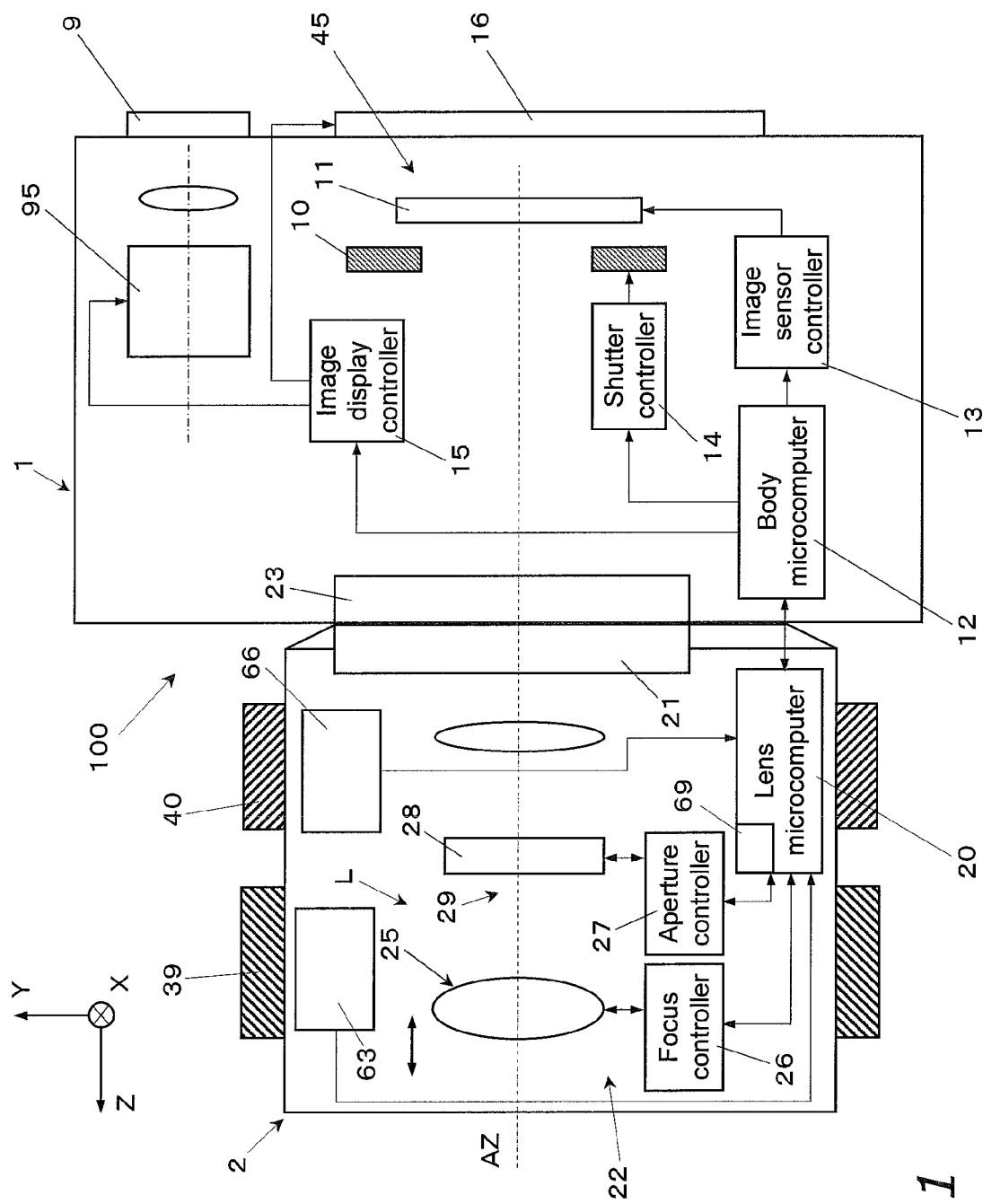
FIG. 1 is a diagram of the overall configuration of a digital camera.
Figure 2:
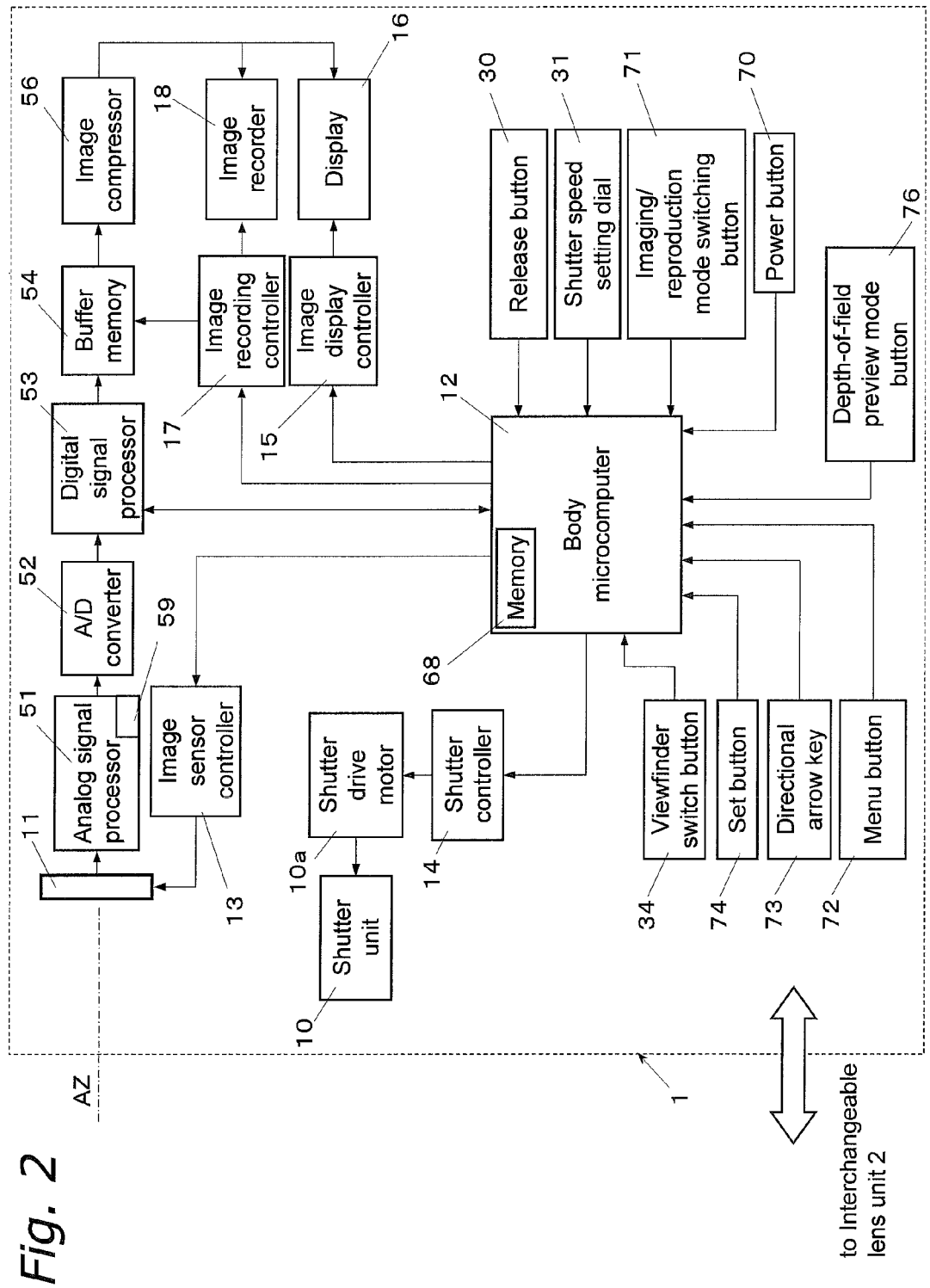
FIG. 2 is a block diagram of a control system for a camera main body.
Figure 3:
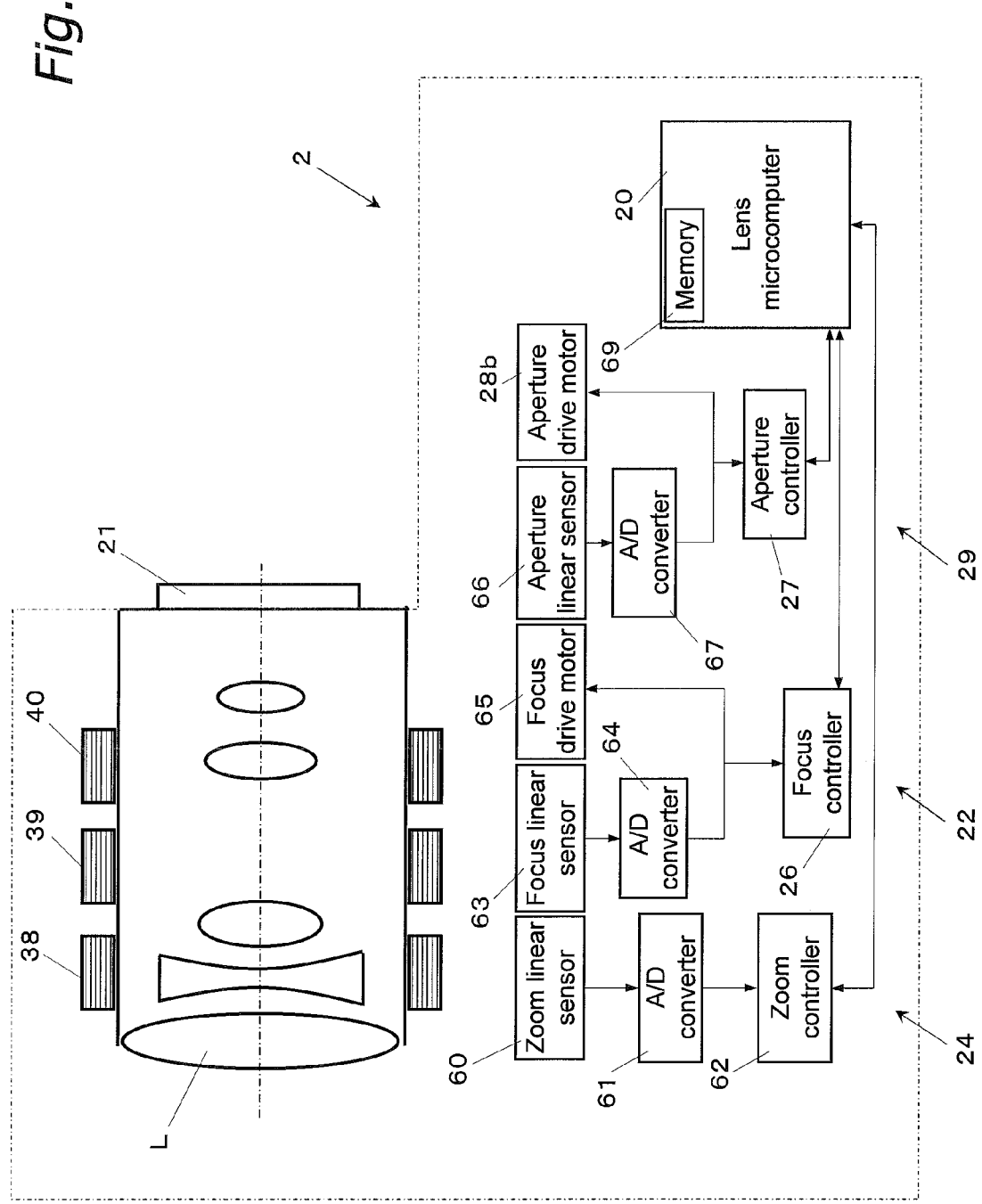
FIG. 3 is a block diagram of a control system for an interchangeable lens.

A digital camera 100 (an example of an imaging device) will be described as a first embodiment through reference to FIGS. 1 to 3. FIG. 1 is a diagram of the overall configuration of the digital camera 100. FIG. 2 is a control block diagram for a camera main body 1. FIG. 3 is a control block diagram for an interchangeable lens unit 2.

The digital camera 100 is an interchangeable lens type of single-reflex digital camera. The digital camera 100 mainly comprises the camera main body 1 and the interchangeable lens unit 2, which is removably mounted on the camera main body 1. The interchangeable lens unit 2 forms an optical image of a subject. The camera main body 1 converts an optical image formed by the interchangeable lens unit 2 into an image signal, and records image data, displays images, and so forth.

1.1: Interchangeable Lens Unit

As shown in FIGS. 1 and 3, the interchangeable lens unit 2 mainly comprises an optical system L, a zoom adjuster 24 that adjusts the zoom magnification of the optical system L, a focal point adjuster 22 that adjusts the focal point of the optical system L, an aperture adjuster 29 that adjusts the aperture value of the optical system L (the actual F value that varies with the opening of the aperture), and a lens microcomputer 20 (an example of the controller) serving as a lens controller. The optical system L forms the subject image on an image sensor 11 of the camera main body 1.

The lens microcomputer 20 is configured to control the various sequences of the interchangeable lens unit 2. The lens microcomputer 20 holds various lens information related to the interchangeable lens unit 2. The lens microcomputer 20 allows two-way communication between zoom controller 62, a focus controller 26, and an aperture controller 27.

As shown in FIGS. 1 and 3, the zoom adjuster 24 mainly has a zoom linear sensor 60, an A/D converter 61, and the zoom controller 62. The zoom controller 62 is able to receive signals from the zoom linear sensor 60 through the A/D converter 61. The zoom controller 62 converts the rotational angle of a zoom ring 38 detected by the zoom linear sensor 60 into focal length information for the optical system L. The zoom controller 62 sends focal length information to the lens microcomputer 20.

As shown in FIGS. 1 and 3, the focal point adjuster 22 mainly has a focus lens group 25 (an example of the focus lens) and the focus controller 26 that controls the operation of the focus lens group 25. The focus controller 26 is able to receive signals from a focus linear sensor 63, and is able to send signals to a focus drive motor 65 through an A/D converter 64. The focus linear sensor 63 detects the rotational angle of a focus ring 39. The A/D converter 64 digitizes rotational angle information detected by the focus linear sensor 63. The focus controller 26 converts the rotational angle information for the focus ring 39 digitized by the A/D converter 64 into object point distance information. The focus controller 26 sends the object point distance information to the lens microcomputer 20 on the basis of a command from the lens microcomputer 20. The focus controller 26 drives the focus drive motor 65 on the basis of a control signal from the lens microcomputer 20. Focal point adjustment is carried out in this way by the focal point adjuster 22.

The aperture adjuster 29 mainly has an aperture unit 28, the aperture controller 27 that controls the operation of the aperture unit 28, and an aperture ring 40 for setting the aperture value. The aperture unit 28 has aperture blades (not shown) and an aperture drive motor 28b for driving the aperture blades.

The aperture controller 27 detects the aperture value set by the aperture ring 40. More specifically, the aperture linear sensor 66 shown in FIG. 3 detects the rotational angle of the aperture ring 40. An A/D converter 67 digitizes the rotational angle detected by the aperture ring 40. The aperture controller 27 is able to receive signals from the aperture linear sensor 66 through the A/D converter 67, and converts rotational angle information for the aperture ring 40 digitized by the A/D converter 67 into aperture value information.

The aperture controller 27 sends aperture value information to the lens microcomputer 20 on the basis of a command from the lens microcomputer 20, and drives the aperture drive motor 28b on the basis of a control signal from the lens microcomputer 20. The aperture drive motor 28b drives the aperture blades according to the aperture value set with the aperture ring 40, upon receiving a control signal from the aperture controller 27. The aperture value of the optical system L is thus adjusted by the aperture adjuster 29.

The interchangeable lens unit 2 further has a lens mount 21, and is removably mounted to a body mount 23 provided to the front face of the camera main body 1 via the lens mount 21. The interchangeable lens unit 2 has an electrical contact (not shown) provided to the lens mount 21. The camera main body 1 has an electrical contact (not shown) provided to the body mount 23. Lens information and various control signals are sent back and forth between a body microcomputer 12 (discussed below) and the lens microcomputer 20 through these an electrical contacts.

1.2: Camera Main Body

As shown in FIGS. 1 and 2, the camera main body 1 mainly has a shutter unit 10, an image capturing unit 45, and the body microcomputer 12 (as a main body controller). The body microcomputer 12 controls various sequences.

The image capturing unit 45 mainly has the image sensor 11 and an image sensor controller 13 that controls the operation of the image sensor 11. The image sensor 11 is CCD (charge coupled device) or the like. The imaging sensor 11 converts an optical image formed by the optical system L of the interchangeable lens unit 2 into an image signal.

As shown in FIG. 2, an output from the imaging sensor 11 is processed by an analog signal processor 51, an A/D converter 52, a digital signal processor 53, a buffer memory 54, and an image compressor 56, in that order. More specifically, an image signal is sent from the imaging sensor 11 to the analog signal processor 51. The analog signal processor 51 subjects the image signal outputted by the imaging sensor 11 to analog signal processing, such as gamma processing.

The analog signal processor 51 is equipped with an AGC (Auto Gain Control) 59 serving as an image adjuster that corrects the level (gain) of an analog image signal. This AGC 59 has an amplifier function that compensates when the image signal level is too low, such as when suitable exposure is not obtained in the depth-of-field preview mode (discussed below). With this amplifier function, the analog image signal is amplified by the proper ratio corresponding to the input aperture value, so as to fall within the input voltage range of the A/D converter 52 (discussed below). For example, this analog signal processor 51 uses the AGC 59 to perform processing on an actual aperture image captured in the depth-of-field preview mode (discussed below), such as changing the gain so that the image brightness will be favorable for display on a display 16, such as a liquid crystal monitor. Consequently, even when the aperture value is large, the image displayed on the display 16 will be bright, and it will be easy to view the actual aperture image.

Image signals recorded to an image recorder 18 or the buffer memory 54 can be displayed as visible images on an electronic viewfinder 95, just as they can be displayed on the display 16, on the basis of a command from an image display controller 15.

Consequently, even though the quick return mirror installed in a conventional single lens reflex cameras is not installed, an optical image of a subject formed by the optical system L can be viewed on the display 16 or through a viewfinder eyepiece window 9. As a result, the camera main body 1 can be made thinner in the direction along the optical axis AZ. Furthermore, the distance from the lens at the rearmost part of the interchangeable lens unit 2 to the image sensor 11 (lens back) can be shortened, so the interchangeable lens unit 2 can be more compact.

An image signal that has undergone analog signal processing is sent from the analog signal processor 51 to the A/D converter 52. The A/D converter 52 converts the analog image signal outputted from the analog signal processor 51 into a digital signal.

The digital signal processor 53 subjects the image signal converted into a digital signal by the A/D converter 52 to digital signal processing, such as noise elimination or contour enhancement. The image signal that has undergone digital signal processing is sent from the digital signal processor 53 to the buffer memory 54. The buffer memory 54 temporarily stores the image signal processed by the digital signal processor 53. The buffer memory 54 consists of a RAM (random access memory) or the like.

The image signal stored in the buffer memory 54 is sent from the buffer memory 54 to the image compressor 56 according to a command from an image recording controller 17. The image compressor 56 subjects the image signal to compression processing according to a command from the image recording controller 17. The image signal is compressed by this compression processing to a data size that is smaller than that of the original data. The compression method can be, for example, JPEG (Joint Photographic Experts Group). The compressed image data is sent from the image compressor 56 to the image recorder 18 and the display 16.

The image recording controller 17 and the image recorder 18 are provided to record image signals. The image recording controller 17 tells the image recorder 18 to read or write image data from or to a card-type recording medium (not shown), for example. More specifically, the image recording controller 17 controls the image recorder 18 on the basis of a control signal from the body microcomputer 12. The image recorder 18 records the image data to an internal memory and/or a recording medium on the basis of a command from the image recording controller 17. The information to be stored along with the image data includes, for example, the date and time the image was captured, focal length information, shutter speed information, aperture value information, and photography mode information.

The display 16 is provided to display an image of the subject. The image display controller 15 controls the display 16 on the basis of a control signal from the body microcomputer 12. More specifically, the image display controller 15 reads image data acquired by the image sensor 11, subjects the image data to specific processing, and then displays the image on the display 16. The display 16 displays the image signal as a visible image on the basis of a command from the image display controller 15, and displays various kinds of information. The information to be stored includes, for example, focal length information, shutter speed information, aperture value information, photography mode information, focus state information, whether the interchangeable lens unit 2 has an aperture ring 40, and the aperture value setting step and setting width. Also, the display 16 displays the setting screen to be used by the user in specific imaging and reproduction modes on the basis of a command from the image display controller 15.

The body microcomputer 12 allows two-way communication between the image recording controller 17, the image display controller 15, and the digital signal processor 53. The body microcomputer 12 has a memory 68 that holds various information and signals.

1.3: Operating Unit

Figure 4:
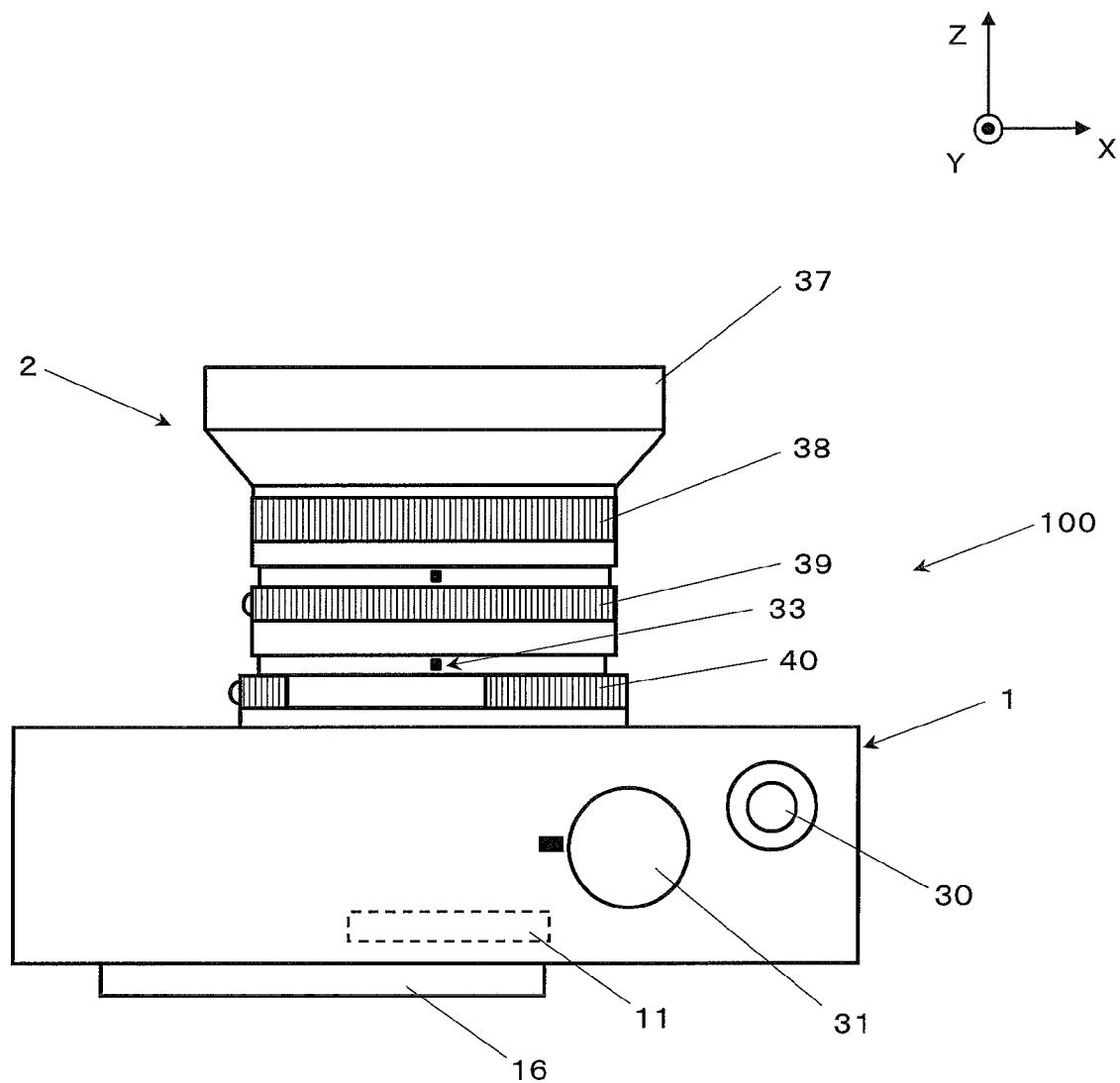
FIG. 4 is a top view of the imaging device.
Figure 5:
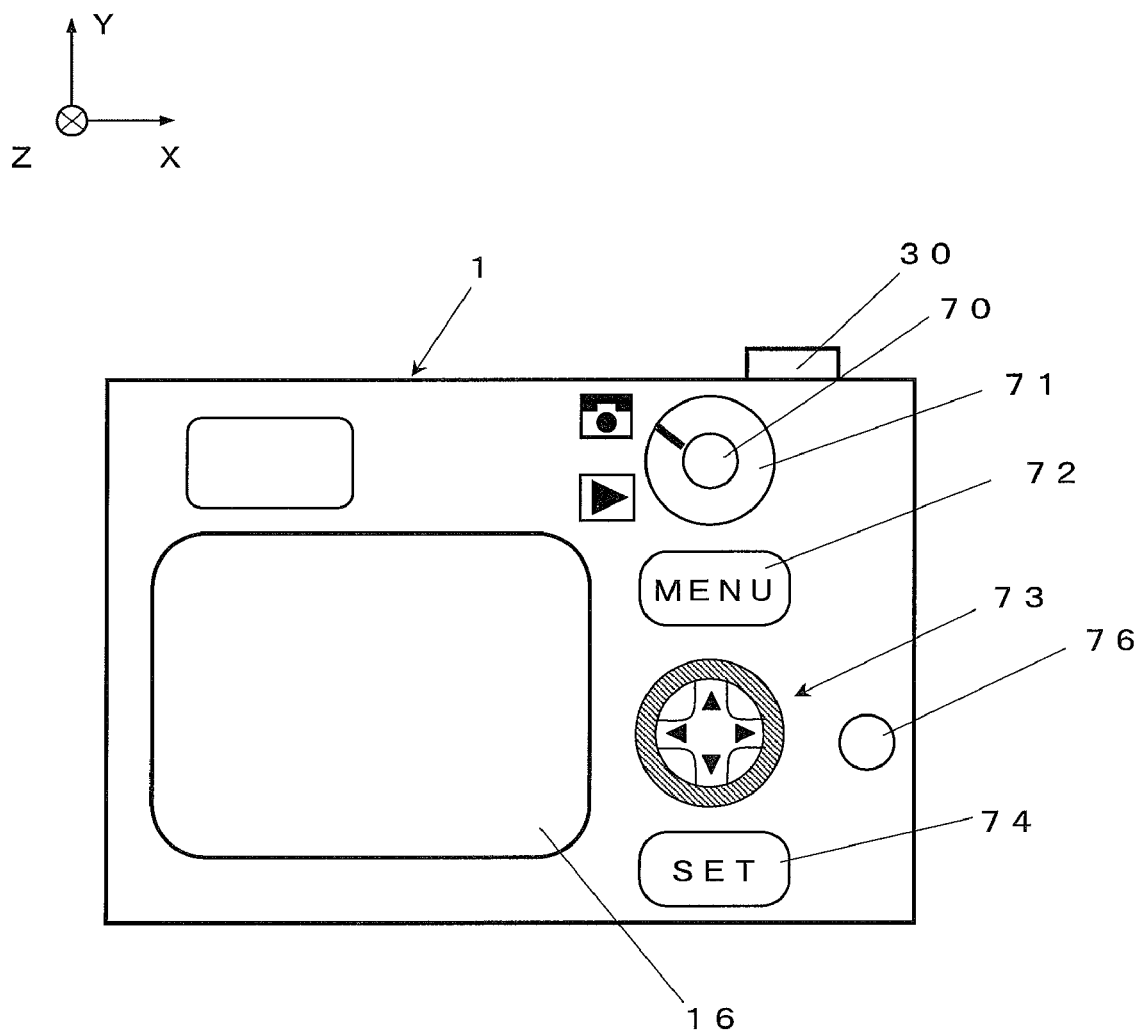
FIG. 5 is a rear view of the imaging device.

The operating unit of the digital camera 100 will now be described through reference to FIGS. 4 and 5. FIG. 4 is a top view of the digital camera 100, and FIG. 5 is a rear view of the camera main body 1.

As shown in FIG. 4, the camera main body 1 is provided with a release button 30 (an example of the focal point adjustment operating unit) and a shutter speed setting dial 31. The release button 30 and the shutter speed setting dial 31 are provided to the top face of the camera main body 1.

The release button 30 is a two-stage switch that can be pressed half way or all the way down, for sending the shutter operation timing to the body microcomputer 12. When the user pushes the release button 30 down half way, this starts light measurement and ranging, and when the button is pushed all the way down, this starts imaging. The shutter speed setting dial 31 is a control member for setting the shutter speed. The shutter speed setting dial 31 sends set shutter speed information and shutter mode information. The shutter speed can be adjusted by turning the shutter speed setting dial 31. The shutter speed setting dial 31 has an auto position at which the shutter speed is set automatically.

As shown in FIG. 4, a filter mount 37 is provided on the subject side of the interchangeable lens unit 2. The zoom ring 38, the focus ring 39, and the aperture ring 40 are disposed on the interchangeable lens unit 2 in that order, from the filter mount 37 side toward the camera main body 1 side (the Z axis direction negative side). The zoom ring 38, the focus ring 39, and the aperture ring 40 are all cylindrical, rotating control members, and are rotatably disposed around the outer peripheral face of the interchangeable lens unit 2. The aperture ring 40 is an example of an aperture value setting unit.

As shown in FIG. 5, a power button 70, an imaging/reproduction mode switching button 71, a menu button 72, a directional arrow key 73, a set button 74, and a depth-of-field preview mode button 76 (an example of the mode operating unit) are provided on the rear face of the camera main body 1. The display 16 is also provided on the rear face of the camera main body 1 (the face on the user side; the face on the Z axis direction negative side).

The power button 70 is a control member that is operated to turn the power on and off to the digital camera 100. The imaging/reproduction mode switching button 71 is a control member that is operated to switch between an imaging mode and a reproduction mode. The imaging mode referred to here is a mode for capturing a new subject image and creating an image signal with the digital camera 100. The reproduction mode is a mode configured to display image data already captured and stored in the digital camera 100.

When the user wants to capture an image, the power button 70 is switched on, and the imaging/reproduction mode switching button 71 is switched to the imaging mode. As a result, the digital camera 100 is powered on, and a visible image of the subject, which has been converted into an electrical image signal by the image sensor 11, is displayed on the display 16 on the basis of a command from the image display controller 15.

The menu button 72 is a control member that is operated to display various operation menus on the display 16. When the digital camera 100 is in the imaging mode, and the user presses the menu button 72, a setting menu screen is displayed on the display 16 on the basis of a command from the image display controller 15. The setting menu screen displays icons of setting categories that can be changed by the user.

The directional arrow key 73 has up, down, left, and right arrow keys, and is a control member that is operated to select displayed categories from various operation menus. The set button 74 is a control member that is operated to set the display categories on various operation menus. The depth-of-field preview mode button 76 is a button that is operated to move to the depth-of-field preview mode (discussed below).

The body microcomputer 12 is able to receive signals from the release button 30, the shutter speed setting dial 31, the imaging/reproduction mode switching button 71, the menu button 72, the directional arrow key 73, the set button 74, and the depth-of-field preview mode button 76.

1.4: Aperture Ring

Figure 6A:
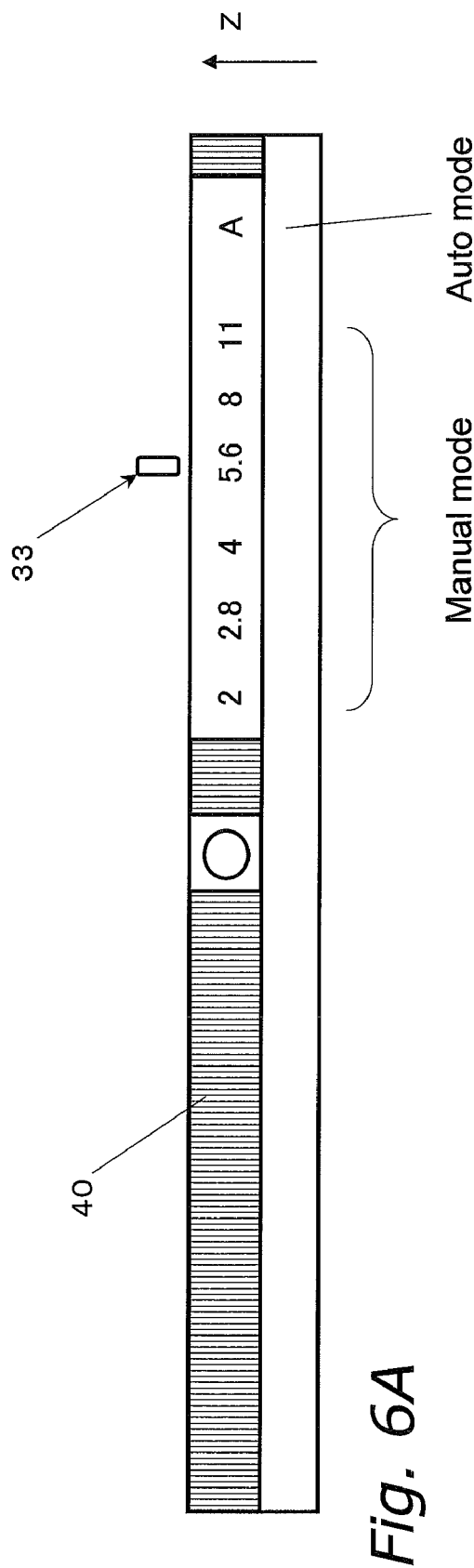
FIG. 6A is a development view of an aperture ring as seen from the outside in the radial direction.
Figure 6B:
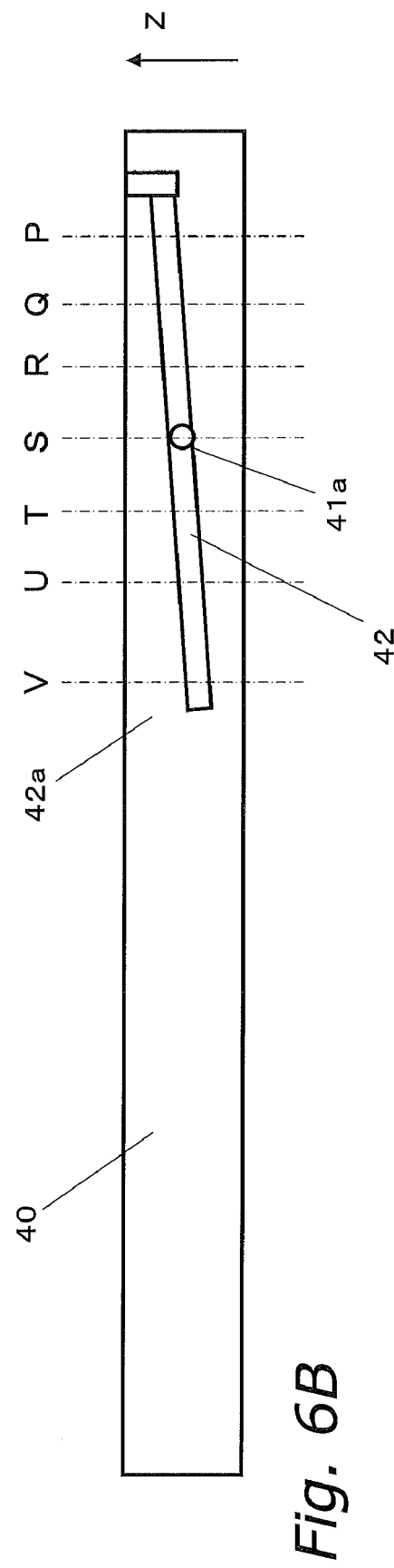
FIG. 6B is a development view of an aperture ring as seen from the inside in the radial direction.
Figure 7:
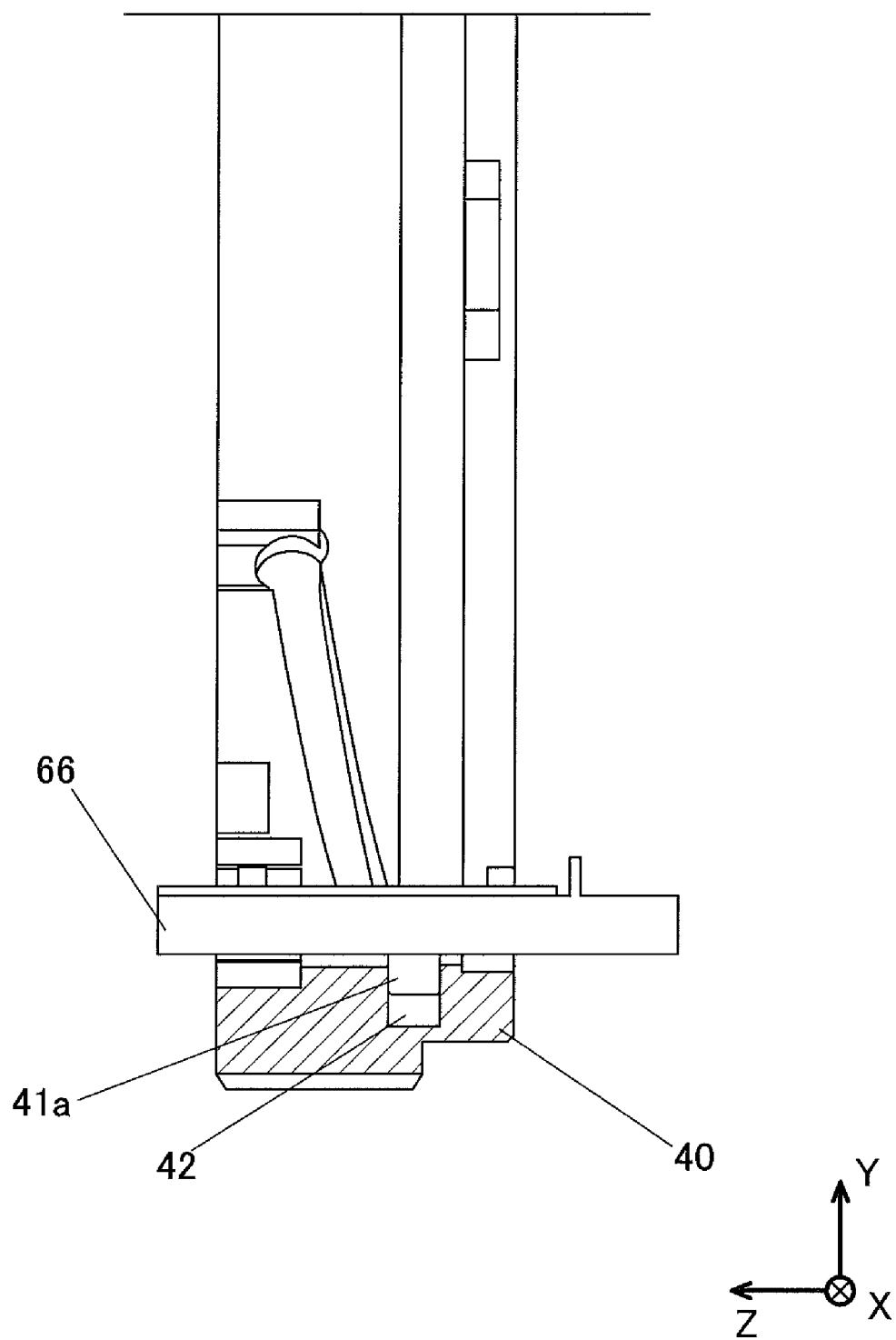
FIG. 7 is a cross section of the coupled portion of a aperture ring and an aperture linear sensor.
Figure 9:
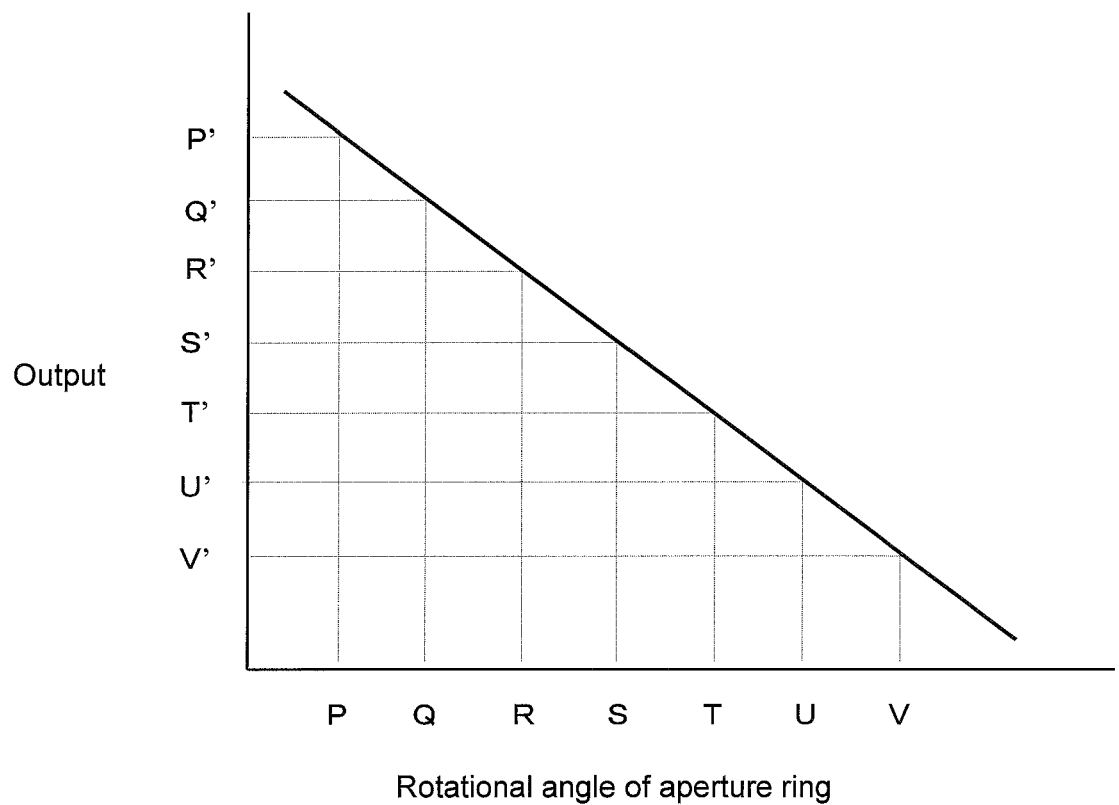
FIG. 9 is a graph of the relationship between the position of a slider with respect to the aperture ring, and the output of the aperture linear sensor.

The aperture ring 40 will now be described through reference to FIGS. 6 to 9. FIG. 6A is a development view of the aperture ring 40 as seen from the outside in the radial direction, and FIG. 6B is a development view of the aperture ring as seen from the inside in the radial direction. FIG. 7 is a cross section of the coupled portion of the aperture ring 40 and the aperture linear sensor 41. FIG. 8A is a diagram of the circuit configuration of the aperture linear sensor 41. FIG. 9 is a graph of the relationship between the rotational angle of the aperture ring 40 and the output value of the aperture linear sensor 41.

As shown in FIG. 6A, the aperture value is displayed around the outer peripheral face of the aperture ring 40. The aperture value display area is divided into two areas. More specifically, as shown in FIG. 6A, the display portion for each aperture value (1 AV) from "2" to "11" corresponds to the manual mode. As shown in FIG. 6A, the "A" display portion corresponds to the auto mode. As shown in FIG. 6B, a linear cam groove 42 is formed around the inner peripheral part of the aperture ring 40.

As shown in FIG. 7, the aperture linear sensor 41 has a cylindrical slider 41a that sticks outward in the radial direction of the aperture ring 40. As shown in FIGS. 6B and 7, the slider 41a of the aperture linear sensor 41 is inserted in the cam groove 42 formed in the aperture ring 40. When the aperture ring 40 is turned, the slider 41a moves along the cam groove 42 in the direction of the optical axis (the Z axis direction).

As shown in FIG. 8A, the aperture linear sensor 41 is constituted by a circuit having a variable resistor. The terminal T2 shown in FIG. 8A is connected to the slider 41a, and terminals T2 and T3 are connected to the ends 41b and 41c of the aperture linear sensor shown in FIG. 7. A specific voltage is applied between the terminals T1 and T3. The output (output voltage) of the terminal T2 varies linearly as shown in FIG. 8B when the slider 41a sides over a magnetic resistor in the aperture linear sensor 41.

As shown in FIGS. 6A and 6B, when the position at which the number "2" is displayed on the aperture ring 40 lines up with the position of a pointer 33, the slider 41a of the aperture linear sensor 41 is at the position P of the cam groove 42. In this case, as shown in FIG. 9, the output value (output voltage value) of the aperture linear sensor 41 is P'. That is, when the position at which the number "2" is displayed on the aperture ring 40 lines up with the position of the pointer 33, the output voltage value of the aperture linear sensor 41 is P'.

Similarly, when the aperture ring 40 is turned and any of the positions at which the numbers "2.8," "4," "5.6," "8," "11," and "A" are displayed is lined up with the position of the pointer 33, the slider 41a of the aperture linear sensor 41 is at one of the positions Q, R, S, T, U, and V. In this case, the output value (output voltage value) of the aperture linear sensor 41 is Q', R', S', T', U', or V', respectively. That is, when any of the positions at which the numbers "2.8," "4," "5.6," "8," "11," and "A" are displayed is lined up with the position of the pointer 33, the output voltage value of the aperture linear sensor 41 is Q', R', S', T', U', or V'.

Thus, the aperture linear sensor 41 has an output in a 1:1 correspondence with the rotational angle of the aperture ring 40, and an aperture value signal corresponding to the rotational angle of the aperture ring 40 is outputted as a voltage change. Therefore, the rotational angle of the aperture ring 40 can be detected on the basis of the output from the aperture linear sensor 41.

2: Operation of Digital Camera 2.1: Imaging Mode

Next, the drive sequence in monitor imaging mode, in which the user captures an image using the display 16, will be described through reference to FIGS. 1 to 3 and FIG. 5.

The auto-focusing method used in this monitor imaging mode is a contrast detection auto-focusing method based on image data produced by the image sensor 11, instead of the phase difference detection method featuring a focal point detection unit mounted along with a quick return mirror used in conventional single lens reflex cameras. Using a contrast detection method for the auto focusing in monitor imaging mode (live view imaging mode) using the display 16 allows the imaging device to have a very accurate focusing operation. In this monitor imaging mode, image data is produced by the image sensor 11 in steady-state fashion, so auto focusing by contrast detection method using this image data is easier than with a conventional phase difference detection method.

Auto focusing by contrast detection method will now be described.

When auto focusing by a contrast detection method is performed, the body microcomputer 12 sends a request for contrast detection data to the lens microcomputer 20. The contrast detection data is data that is necessary in auto focusing by contrast detection method, and includes, for example, the focus drive speed, the amount of focus shift, the magnification ratio, and information about whether or not contrast detection is possible. The body microcomputer 12 periodically produces a vertical synchronization signal. In parallel with this, the body microcomputer 12 produces an exposure synchronization signal on the basis of the vertical synchronization signal. An exposure synchronization signal can be produced because the exposure start timing and exposure end timing have been ascertained in advance by the body microcomputer 12 on the basis of the vertical synchronization signal. The body microcomputer 12 outputs the vertical synchronization signal to a timing generator (not shown), and outputs the exposure synchronization signal to the lens microcomputer 20. The lens microcomputer 20 acquires position information about the focus lens group 25 in synchronization with the exposure synchronization signal.

The image sensor controller 13 periodically produces an electronic shutter drive signal and a read signal of the image sensor 11 on the basis of the vertical synchronization signal. The image sensor controller 13 drives the image sensor 11 on the basis of the electronic shutter drive signal and the read signal. That is, the image sensor 11 reads the pixel data produced by numerous opto-electric conversion elements (not shown) present in the image sensor 11, to a vertical transfer part (not shown).

Next, the imaging operation will be described in specific terms. When the user presses the release button 30 half way down, the body microcomputer 12 of the digital camera 100 receives various kinds of lens data from the lens microcomputer 20 of the interchangeable lens unit 2, via the lens mount 21 and the body mount 23, and stores these in the built-in memory 68. The body microcomputer 12 also issues a command to the lens microcomputer 20 to start auto focusing. When the release button 30 is pushed half way down, the auto focus start command is a command to start auto focusing by a contrast detection method. On the basis of this command, the lens microcomputer 20 controls and drives the focus lens group 25 in the direction of the optical axis AZ. The body microcomputer 12 calculates an evaluation value for auto focusing (hereinafter referred to as the AF evaluation value) on the basis of the received image data. More specifically, a method is known in which a brightness signal is found from the image data produced by the image sensor 11, the high-frequency part in the screen of the brightness signal is multiplied, and the AF evaluation value is found. The AF evaluation value thus calculated is stored in a DRAM (not shown) in a state of being associated with the exposure synchronization signal. The lens position information from the lens microcomputer 20 is also associated with the exposure synchronization signal. Accordingly, the body microcomputer 12 can stored the AF evaluation value in relation to the lens position information.

Next, the body microcomputer 12 finds the contrast peak on the basis of the AF evaluation value stored in the DRAM, and monitors whether the focal point has been obtained. More specifically, the position of the focus lens group 25 at which the AF evaluation value is at its maximum is taken as the focal point. The hill-climbing method is commonly known as this lens drive method.

In this state, the digital camera 100 displays as a through-image the image indicated by the image data produced by the image sensor 11 on the display 16. Because this through-image is displayed on the display 16 as a moving image (live view), the user can determine the composition for capturing a still image while looking at the display 16.

After this, when the user presses the release button 30 all the way down, the body microcomputer 12 instructs the lens microcomputer 20 to set the aperture value to the one calculated on the basis of the output from a photometer sensor (not shown). The lens microcomputer 20 then controls the aperture controller 27 such that the aperture corresponds to the indicated aperture value. The image sensor controller 13 directs the image sensor 11 to be driven, and directs the shutter unit 10 to be operated. The image sensor controller 13 also exposes the image sensor 11 for the time of the specific shutter speed calculated from the output of the image sensor 11.

Upon completion of the exposure, the image data read by the image sensor controller 13 from the image sensor 11 is subjected to specific image processing, after which it is displayed as a captured image on the display 16. The image data that has been read from the image sensor 11 and subjected to the specific image processing is written via the image recorder 18 as image data to a memory medium.

Multipoint ranging can also be used as the auto focus method for the digital camera 100. In multipoint ranging, nine ranging regions Fa are preset, for example, the focal state is detected in each ranging region Fa during focus control, and the ideal focal position for the main subject is calculated. These ranging regions Fa are automatically set by the digital camera 100, or the user can use the directional arrow key 73 to set to the desired place.

2.2: Selection of Exposure Setting Mode

The digital camera 100 has as its exposure setting modes a program imaging mode, a shutter speed preferential imaging mode, an aperture preferential imaging mode, and a manual imaging mode. The program imaging mode is used to perform automatic exposure setting with respect to a normal imaging region. The shutter speed preferential mode is used to set the shutter speed manually. The aperture imaging mode is used to set the aperture value manually. The manual imaging mode is used to set both the shutter speed and the aperture value manually.

These four exposure setting modes can be selected with the aperture ring 40 and the shutter speed setting dial 31. More specifically, for example, in a state in which the letter "A" on the aperture ring 40 lines up with the pointer 33, when the shutter speed is set to auto with the shutter speed setting dial 31, the program imaging mode is selected. When the letter "A" on the aperture ring 40 lines up with the pointer 33 and the shutter speed is set to manual with the shutter speed setting dial 31, the shutter speed preferential imaging mode is selected. When any of the numbers "2" to "11" on the aperture ring 40 lines up with the pointer 33 and the shutter speed is set to auto with the shutter speed setting dial 31, the aperture preferential imaging mode is selected. When any of the numbers "2" to "11" on the aperture ring 40 lines up with the pointer 33 and the shutter speed is set to manual with the shutter speed setting dial 31, the manual imaging mode is selected.

Hereinafter, of the four exposure setting modes, the program imaging mode and the shutter speed preferential imaging mode will be collectively referred to as the auto aperture mode. Of the four exposure setting modes, the aperture preferential imaging mode and the manual imaging mode will be collectively referred to as the manual aperture mode.

2.3: Auto Aperture Mode

The aperture linear sensor 66 outputs a signal corresponding to the rotational angle of the aperture ring 40 to the aperture controller 27. When the letter "A" on the aperture ring 40 lines up with the pointer 33 and the release button 30 is pressed, the aperture controller 27 decides that the exposure setting mode is the auto aperture mode on the basis of the signal received from the aperture linear sensor 66. The result of the decision by the aperture controller 27 is set to the lens microcomputer 20 and the body microcomputer 12. The transmission to the body microcomputer 12 here is carried out via communication between the lens microcomputer 20 and the body microcomputer 12.

The shutter speed setting dial 31 outputs a signal corresponding to the rotational angle to the body microcomputer 12. The body microcomputer 12 determines that the exposure setting mode is the auto aperture mode on the basis of the decision result received from the aperture controller 27 and the signal from the shutter speed setting dial 31.

A command is sent from the body microcomputer 12 to the digital signal processor 53, and an image signal is sent by the digital signal processor 53 to the body microcomputer 12 at a specific timing. The exposure value is calculated by the body microcomputer 12 on the basis of the image signal sent from the digital signal processor 53. If the exposure setting mode is the program imaging mode, the appropriate combination of aperture value and shutter speed is determined by the body microcomputer 12 from the adjustable aperture value and shutter speed. If the exposure setting mode is the shutter speed preferential imaging mode, the appropriate aperture value for the set shutter speed is calculated by the body microcomputer 12.

A control signal is produced by the body microcomputer 12 on the basis of the calculation result. This control signal is sent from the body microcomputer 12 to the aperture controller 27 via the lens microcomputer 20. If the exposure setting mode is the program imaging mode, a control signal based on the calculated shutter speed is sent from the body microcomputer 12 to a shutter controller 14. If the exposure setting mode is the shutter speed preferential imaging mode, the shutter speed set with the shutter speed setting dial 31 is sent from the body microcomputer 12 to the shutter controller 14.

At the same time, a control signal is sent from the body microcomputer 12 to the image display controller 15. The image display controller 15 drives the display 16 on the basis of this control signal. More specifically, if the exposure setting mode is the program imaging mode, the image display controller 15 puts a display on the display 16 indicating that the exposure setting mode is the program imaging mode. If the exposure setting mode is the shutter speed preferential imaging mode, the image display controller 15 puts a display on the display 16 indicating that the exposure setting mode is the shutter speed preferential imaging mode.

A drive signal for driving the aperture drive motor 28b is produced by the aperture controller 27 on the basis of a control signal from the lens microcomputer 20. The aperture drive motor 28b is driven on the basis of this drive signal, and the aperture blades of the aperture unit 28 are driven by the aperture drive motor 28b.

A drive signal for driving a shutter drive motor 10a is produced by the shutter controller 14 on the basis of a control signal from the body microcomputer 12. The shutter drive motor 10a is driven on the basis of this drive signal, and a shutter unit 10 is driven by the shutter drive motor 10a.

Exposure setting is performed in the auto aperture mode with the digital camera 100 as discussed above. The above operation is executed instantly after the operation of the release button 30.

Upon completion of imaging, a control signal is sent from the body microcomputer 12 to the image recording controller 17. As a result, an image signal is recorded to an internal memory and/or a recording medium by the image recorder 18 on the basis of a command from the image recording controller 17.

If the exposure setting mode is the program imaging mode, information indicating that the exposure setting mode is the program imaging mode is recorded to an internal memory and/or a recording medium along with the image signal on the basis of a command from the image recording controller 17. If the exposure setting mode is the shutter speed preferential mode, information indicating that the exposure setting mode is the shutter speed preferential mode is recorded to an internal memory and/or a recording medium along with the image signal on the basis of a command from the image recording controller 17.

2.4: Manual Aperture Mode

When any of the numbers "2" to "11" on the aperture ring 40 lines up with the pointer 33 and the release button 30 is pressed, the aperture controller 27 determines that the exposure setting mode is the manual aperture mode on the basis of the signal received from the aperture linear sensor 41. The decision result of the aperture controller 27 is sent to the lens microcomputer 20.

The shutter speed setting dial 31 outputs a signal corresponding to the rotational angle to the body microcomputer 12. The body microcomputer 12 determines that the exposure setting mode is the manual aperture mode on the basis of the decision result received from the aperture controller 27 and the signal from the shutter speed setting dial 31.

The lens microcomputer 20 sends the aperture controller 27 a request for aperture value information detected from the rotational angle of the aperture ring 40. The aperture value information detected from the rotational angle of the aperture ring 40 is set from the aperture controller 27 to the lens microcomputer 20 and the body microcomputer 12 on the basis of a command from the lens microcomputer 20. If the exposure setting mode is the aperture preferential imaging mode, a command is sent from the body microcomputer 12 to the digital signal processor 53, and an image signal is sent from the digital signal processor 53 to the body microcomputer 12 at a specific timing.

If the exposure setting mode is the aperture preferential imaging mode, the body microcomputer 12 calculates the shutter speed on the basis of the image signal. If the exposure setting mode is the aperture preferential imaging mode, the body microcomputer 12 calculates the appropriate shutter speed for the detected aperture value. If the exposure setting mode is the aperture preferential imaging mode, a control signal is produced by the body microcomputer 12 on the basis of the calculation result. If the exposure setting mode is the aperture preferential imaging mode, a control signal based on the calculated shutter speed is sent by the body microcomputer 12 to the shutter controller 14. If the exposure setting mode is the manual imaging mode, the shutter speed set with the shutter speed setting dial 31 is sent by the body microcomputer 12 to the shutter controller 14.

At the same time, a control signal is sent from the body microcomputer 12 to the image display controller 15. The image display controller 15 drives the display 16 on the basis of this control signal. More specifically, if the exposure setting mode is the aperture preferential imaging mode, the image display controller 15 puts a display on the display 16 indicating that the exposure setting mode is the aperture preferential imaging mode. If the exposure setting mode is the manual imaging mode, the image display controller 15 puts a display on the display 16 indicating that the exposure setting mode is the manual imaging mode.

A drive signal for driving the aperture drive motor 28b is produced by the aperture controller 27 on the basis of a control signal from the lens microcomputer 20. The aperture drive motor 28b is driven on the basis of this drive signal, and the aperture blades of the aperture unit 28 are driven by the aperture drive motor 28b.

A drive signal for driving the shutter drive motor 10a is produced by the shutter controller 14 on the basis of a control signal from the body microcomputer 12. The shutter drive motor 10a is driven on the basis of this drive signal, and a shutter unit 10 is driven by the shutter drive motor 10a.

Exposure setting is performed in the manual aperture mode with the digital camera 100 as discussed above. The above operation is executed instantly after the operation of the release button 30.

Upon completion of imaging, a control signal is sent from the body microcomputer 12 to the image recording controller 17. As a result, an image signal is recorded to an internal memory and/or a recording medium by the image recorder 18 on the basis of a command from the image recording controller 17.

If the exposure setting mode is the aperture preferential mode, information indicating that the exposure setting mode is the aperture preferential mode is recorded along with the image signal to an internal memory and/or a recording medium by the image recorder 18 on the basis of a command from the image recording controller 17. If the exposure setting mode is the manual imaging mode, information indicating that the exposure setting mode is the manual imaging mode is recorded along with the image signal to an internal memory and/or a recording medium by the image recorder 18 on the basis of a command from the image recording controller 17.

3: Depth-of-Field Preview Mode

Next, the depth-of-field preview mode during imaging will be described.

3.1: Summary of Depth-of-Field Preview Mode

In the depth-of-field preview mode, confirmation of subject field depth is performed via the display 16. More specifically, when the depth-of-field preview mode button 76 is pressed, the imaging mode automatically changes to the monitor imaging mode. As a result, a real-time image corresponding to the actual aperture value of the aperture unit 28 is displayed on the display 16. Consequently, the subject field depth can be easily confirmed via the display 16. The phrase "mode information is inputted to the mode operating unit" means that the depth-of-field preview mode button 76 is pressed.

For example, when the aperture ring 40 is mounted on the interchangeable lens unit 2 in this depth-of-field preview mode, the lens microcomputer 20 sends a request to the aperture controller 27 for aperture value information detected on the basis of the rotational angle of the aperture ring 40. The aperture value information detected from the rotational angle of the aperture ring 40 is sent by the aperture controller 27 to the lens microcomputer 20 and the body microcomputer 12 on the basis of a command from the lens microcomputer 20. A drive signal for driving the aperture drive motor 28b is produced by the aperture controller 27 on the basis of a control signal from the lens microcomputer 20. The aperture drive motor 28b is driven on the basis of this drive signal, and the aperture blades of the aperture unit 28 are driven by the aperture drive motor 28b.

3.2: Specific Operation in Depth-of-Field Preview Mode

Figure 10:
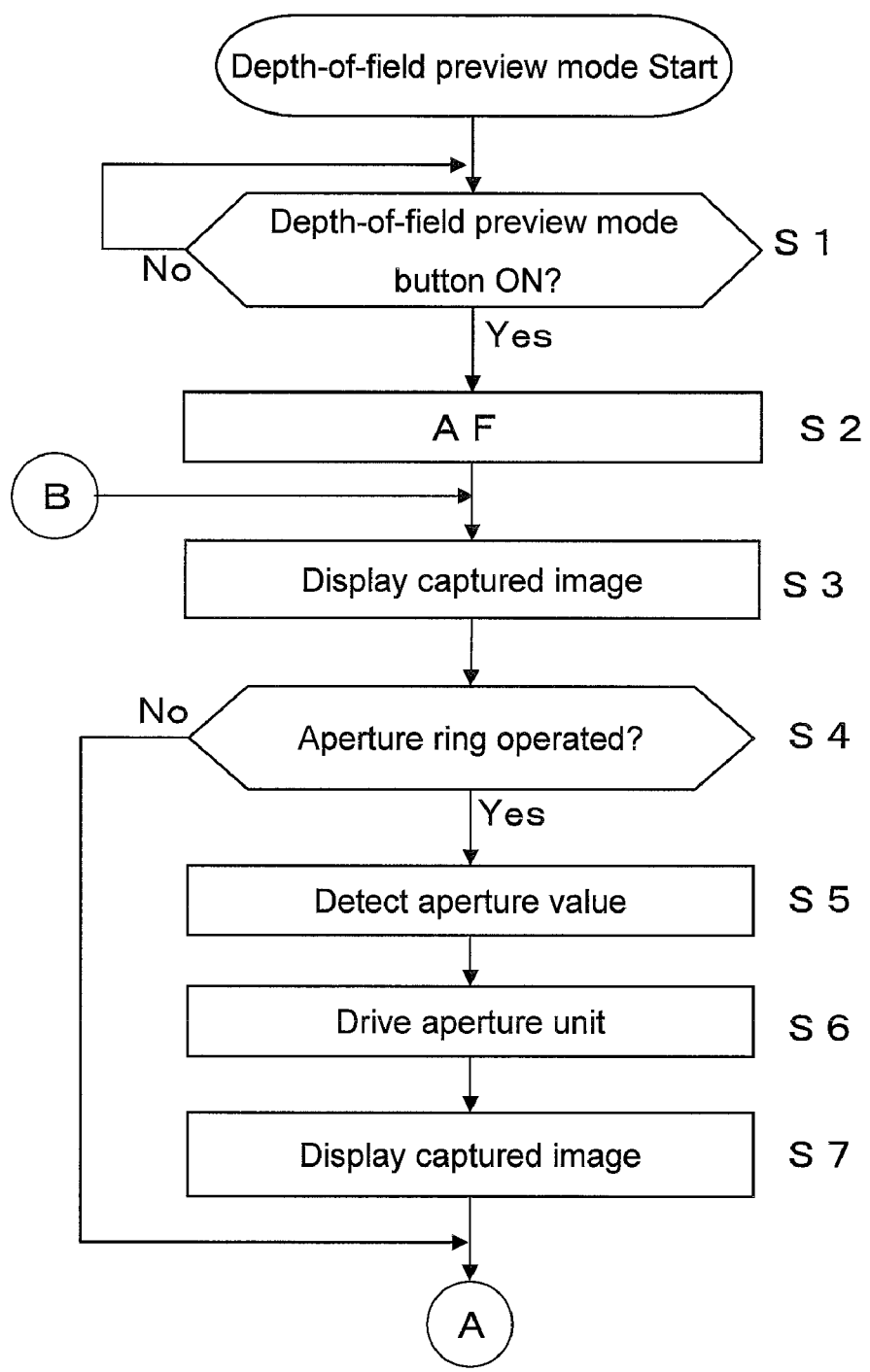
FIG. 10 is a flowchart of the depth-of-field preview mode.
Figure 11:
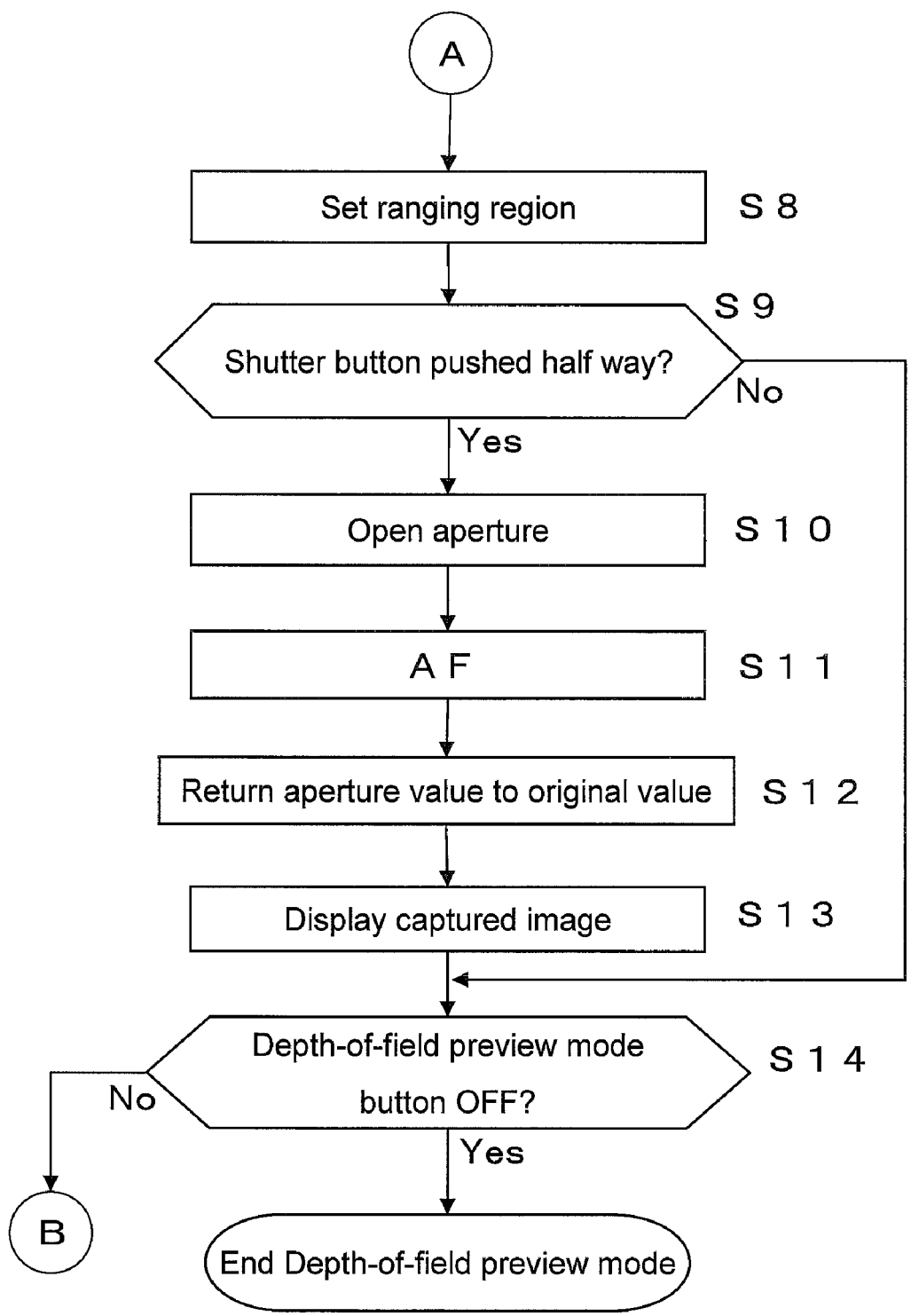
FIG. 11 is a flowchart of the depth-of-field preview mode.
Figure 12A:
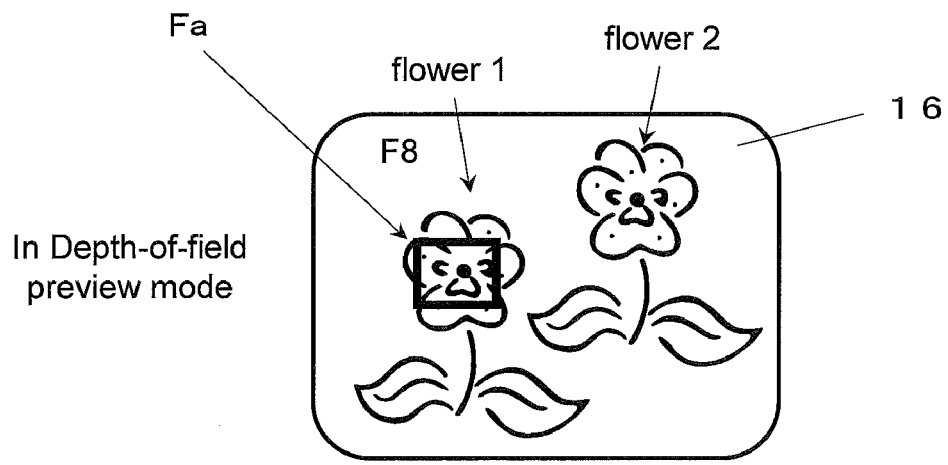
FIGS. 12A, 12B, and 12C are examples of the images displayed on the display unit.
Figure 12B:
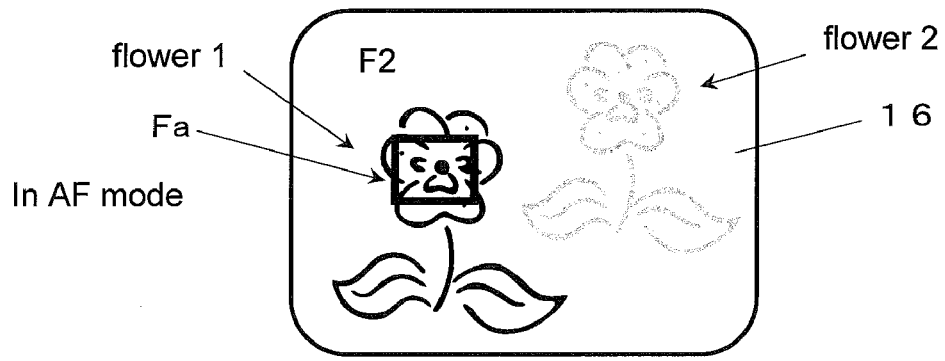
Figure 12C:
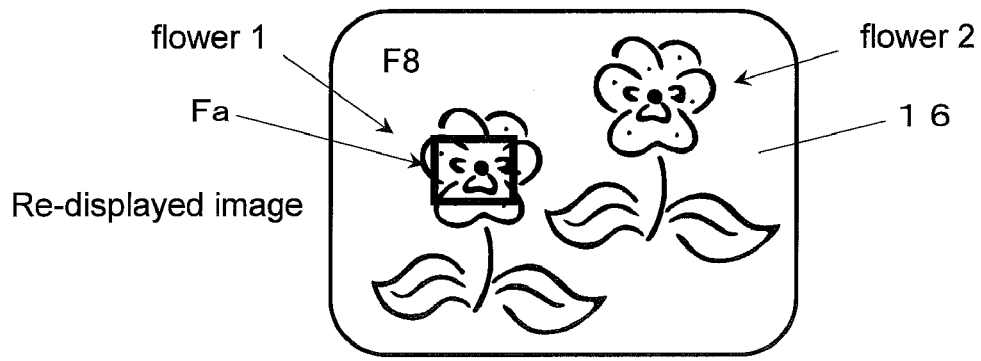

Next, the specific operation in depth-of-field preview mode will be described through reference FIGS. 10 to 12. FIGS. 10 and 11 are flowcharts of the depth-of-field preview mode. FIG. 12A is an example of an actual aperture image at an aperture value of F8. FIG. 12B is an example of an actual aperture image at an aperture value of F2. FIG. 12C is an example of a redisplayed image at an aperture value of F8.

As shown in FIG. 10, it is determined by the body microcomputer 12 whether or not the depth-of-field preview mode button 76 has been pressed (S1). If the depth-of-field preview mode button 76 has been pressed, the mode changes to depth-of-field preview mode (S1). In viewing an image in depth-of-field preview mode, an image that has been focused is preferable. In view of this, with this digital camera 100, when the body microcomputer 12 senses that the depth-of-field preview mode button 76 has been pressed, focal point adjustment is performed by contrast detection method (adjustment of the focal state of the optical image formed by the optical system L) (S2). In a mode other than depth-of-field preview mode, the aperture value is set to F2 (the minimum value at which the aperture is open), so very accurate focal point adjustment can be anticipated with the contrast detection method.

Next, as shown in FIG. 12A, a real-time image obtained by the image sensor 11 is displayed on the display 16 on the basis of a command from the image display controller 15 (S3). When the user operates the aperture ring 40, aperture information based on the rotational angle of the aperture ring 40 is detected by the aperture controller 27 on the basis of a command from the lens microcomputer 20 (S4, S5). A drive signal for driving the aperture drive motor 28b is produced by the aperture controller 27 on the basis of a control signal from the lens microcomputer 20, and the aperture blades of the aperture unit 28 are driven by the aperture drive motor 28b (S6). As a result, the aperture value of the optical system L is changed to the aperture value set with the aperture ring 40. For example, if the aperture value input with the aperture ring 40 is F8, then as shown in FIG. 12A, for example, a real-time image is displayed at the aperture value F8 on the display 16 (S7). Here, the aperture value F8 is displayed in the upper left part of the image on the display 16, for example.

An actual aperture image displayed on the display 16 will be described here. With an actual aperture image, the subject field depth and brightness vary with the aperture value. For instance, as shown in FIG. 12A, when the aperture value is F8, the subject field depth is deep, so a comparison of "flower 1" on the left and "flower 2" on the right reveals that both are in focus.

However, if the subject that the user wants to image is "flower 1" on the left, it is difficult to determine whether or not this "flower 1" is really in focus. Also, focusing with the manual focus each time can be particularly troublesome for novice users.

With this digital camera 100, however, the ranging region can be matched to a designated portion within the image. For example, when the focal point is to be accurately matched to the "flower 1" shown in FIG. 12A, the user manually matches the ranging region Fa to "flower 1" (S8). The directional arrow key 73 is used, for example, to match the ranging region Fa The ranging region Fa is moved in the direction inpulled by the directional arrow key 73. With auto focusing by contrast detection method, the focusing operation can be carried out accurately and quickly by setting the ranging region Fa In this case, the reference for focus evaluation can be set to "flower 1" by setting the ranging region Fa over "flower 1."

If the subject is a person, then the ranging region Fa can be automatically set by detecting the person's face.

When the release button 30 is pressed half way down, auto focusing begins (S9). As discussed above, the contrast detection method is used for this auto focusing.

With this digital camera 100, since the peak position of the contrast value can be more accurately calculated, the aperture is automatically adjusted to an open state before auto focusing is performed. More specifically, when the release button 30 is pressed half way down, a half-way operation signal is sent from the body microcomputer 12 to the lens microcomputer 20. That is to say, the half-way operation signal is a signal for starting auto focusing. The lens microcomputer 20 issues a command to the aperture adjuster 29 so that the aperture value at the aperture adjuster 29 will temporarily result in an open state (in this case, the minimum aperture value F2 (set aperture value)). As a result, as shown in FIG. 12B, the aperture value of the optical system L is adjusted to F2 (S10), and an actual aperture image in which the aperture value is F2 is displayed on the display 16. Here, for example, the input aperture value from the aperture ring 40 at the point when the release button 30 has been pressed is stored by the body microcomputer 12 or the aperture controller 27. After the aperture has been set to an open state, auto focusing is performed by contrast detection method as discussed above (S11). Upon completion of the auto focusing, the aperture value is automatically returned by the aperture adjuster 29 to the state prior to the auto focusing (when the aperture value was F8 (the first aperture value)) (S12). More specifically, upon completion of the auto focusing, the aperture value is automatically returned by the aperture adjuster 29 to the state when the release button 30 was pressed (when the aperture value was F8 (the first aperture value)) (S12). As shown in FIG. 12C, an image of the aperture value F8 set with the aperture ring 40 is again displayed on the display 16 (S13).

Because the aperture value is thus automatically adjusted to a low value (a shallow subject field depth) before auto focusing by contrast detection method, stable precision can be achieved in focal adjustment regardless of the aperture value set with the aperture ring 40. This is particularly effective when the aperture value set with the aperture ring 40 is large (the subject field depth is deep).

Also, the precision of focal adjustment can be further increased by matching the ranging region Fa to the main subject (such as "flower 1") prior to auto focusing.

The amount of incident light on the image sensor 11 within a specific time is generally smaller in an image when the aperture value is F8 than when the aperture value is F2. Accordingly, compared to an image at an aperture value of F2, the image at an aperture value of F8 is displayed darker on the display 16, and is harder for the user to see.

In view of this, with this digital camera 100, an actual aperture image is subjected to gain change processing (gain up) so that the brightness of the image displayed on the display 16 will be favorable for display by the AGC 59 of the analog signal processor 51 discussed above. More specifically, in steps S7 and S13, an analog signal of the actual aperture image is amplified according to the aperture value by the AGC 59. As a result, the brightness of the images shown in FIGS. 12A, 12B, and 12C can be substantially the same, regardless of the aperture value.

Thus, with this digital camera 100, an actual aperture image that becomes darker according to the aperture value can be displayed brightly. Consequently, the user can easily check the subject field depth of an image, without any effect due to differences in brightness.

The body microcomputer 12 determines whether or not the depth-of-field preview mode button 76 is off, and if the depth-of-field preview mode button 76 is on, steps S3 to S13 are repeated (S14). Consequently, a real-time image corresponding to the input aperture value on the aperture ring 40 is displayed on the display 16, and the subject field depth during imaging via the display 16 can be easily checked.

On the other hand, if the depth-of-field preview mode button 76 is off, the depth-of-field preview mode is concluded (S14).

Features

The features of the digital camera 100 are as follows.

(1) With this digital camera 100, since the aperture value is adjusted to the minimum value (F2, open state) before focal state of the optical image is adjusted by the focal point adjuster 22, the subject field depth is deeper when auto focusing is performed by contrast detection method. In particular, since the contrast is higher when the subject field depth is shallower, the precision of auto focusing by contrast detection method is higher. Consequently, stable focal point adjustment is possible regardless of the aperture value set with the aperture ring 40 prior to focal point adjustment.

(2) With this digital camera 100, since the aperture value of the optical system L is automatically returned to the aperture value of F8 from before focal point adjustment upon completion of the focal point adjustment, there is no need to manually operate the aperture after focal point adjustment in order to return the aperture value, which affords smoother imaging.

(3) With this digital camera 100, since the set aperture value is the minimum aperture value, focal point adjustment can be performed in the state of deepest subject field depth, and focal point adjustment by contrast detection method will be more stable.

(4) With this digital camera 100, the operation of the aperture adjuster 29 is controlled by the body microcomputer 12 so that the aperture value of the optical system L will be F2 (minimum value, open state) when the release button 30 is pressed half way down. Accordingly, the aperture is reliably adjusted to be in the open state before auto focusing.

(5) With this digital camera 100, since focal point adjustment is performed by contrast detection method immediately after the start of the depth-of-field preview mode, the subject field depth can be checked using an image that is more or less in focus. Consequently, image differences due to differences in the aperture value can be checked more easily, making the camera more convenient.

In particular, with this digital camera 100, since the aperture value in every mode other than the depth-of-field preview mode is F2 (the minimum value at which the aperture is in an open state), very precise focal point adjustment using contrast detection method is possible immediately after the start of the depth-of-field preview mode.

Other Embodiments

The specific constitution of the present invention is not limited to the above-mentioned embodiment, and various modifications and changes are possible without departing from the gist of the invention.

(1) In the above embodiment, only the checking of the subject field depth with the display 16 was described, but this may also be a sequence in which a still image can be captured by pressing the release button 30 all the way down in the depth-of-field preview mode.

(2) In the above embodiment, the aperture value is changed using the aperture ring 40 mounted on the interchangeable lens unit 2. However, it is also conceivable that the aperture ring 40 will not be mounted on the interchangeable lens unit 2. In this case, for example, the aperture value is changed using a dial or the like mounted on the camera main body 1. The dial mounted on the camera main body 1 need not be a dedicated dial for setting the aperture value, and may have other functions besides aperture value setting.

(3) In the above embodiment, a constitution if an imaging device was described in which no quick return mirror was disposed in front of the image sensor 11, but the present invention can also be applied to a constitution in which quick return mirror is disposed, as with a conventional single lens reflex camera. In this case, in the live view imaging mode, the quick return mirror is retracted away from the optical axis AZ.

(4) In the above embodiment, when the depth-of-field preview mode button 76 is pressed once, the imaging mode changes to the depth-of-field preview mode, and when it is pressed again, the depth-of-field preview mode is released. However, the constitution may be such that the depth-of-field preview mode is continued only while the depth-of-field preview mode button 76 is held down.

(5) In the above embodiment, auto focusing in the depth-of-field preview mode was commenced when the release button 30 was pushed down half way, but a button other than the release button 30 may be separately provided instead. In this case, pushing this button starts auto focusing. When a quick return mirror is provided to a conventional single lens reflex camera, the constitution may be such that pressing the release button 30 down half way disposes the retracted quick return mirror along the optical axis AZ so that auto focusing is possible. Also, when another button besides the release button 30 is used, the constitution may be such that the quick return mirror is disposed along the optical axis AZ so that auto focusing is possible only while the button besides the release button 30 is being pressed.

(6) In the above embodiment, the gain-up processing in steps S7 and S13 is performed by the AGC 59 of the analog signal processor 51. However, it is also conceivable that the brightness of the image is adjusted according to the aperture value by raising the sensitivity of the image sensor 11 by means of the analog signal processor 51 or the like. Also, processing that is equivalent to gain-up processing may be performed in a portion other than the analog signal processor 51.

(7) In the above embodiment, a digital single lens reflex camera was used as an example to describe an imaging device, but the technology discussed above can also be applied to devices other than a digital single lens reflex camera (such as a digital still camera, a digital video camera, a portable telephone terminal equipped with a camera function, a PDA (Personal Digital Assistant) equipped with a camera function, or a PC (Personal Computer) equipped with a camera function), as long as it has an aperture value change function. Possible imaging devices include devices capable of capturing still pictures and moving pictures, devices capable of capturing only still pictures, and devices capable of capturing only moving pictures.

(8) The coordinate axes and directions used in the above description are not meant to limit the usage state of the digital camera 100.

(9) In the above embodiment, auto focusing is performed immediately after the start of the depth-of-field preview mode, but even if step S2 in FIG. 10 is omitted, stable focal point adjustment will still be possible in depth-of-field preview mode by means of steps S10 to S12 in FIG. 11.

Conversely, even if steps S10 to S12 in FIG. 11 are omitted, differences in images due to differences in aperture values will be easier to check by means of S2 in FIG. 10, and the device will be more convenient to use.

(10) In the above embodiment, the aperture is adjusted to an open state in step S10, but the set aperture value in step S10 does not need to be the minimum value. For example, the set aperture value in step S10 may be a relatively small aperture value such as F2.8 or F4. In this case, just as described above, the aperture may be adjusted so that the aperture value of the optical system L will always be the set aperture value.

Figure 13:
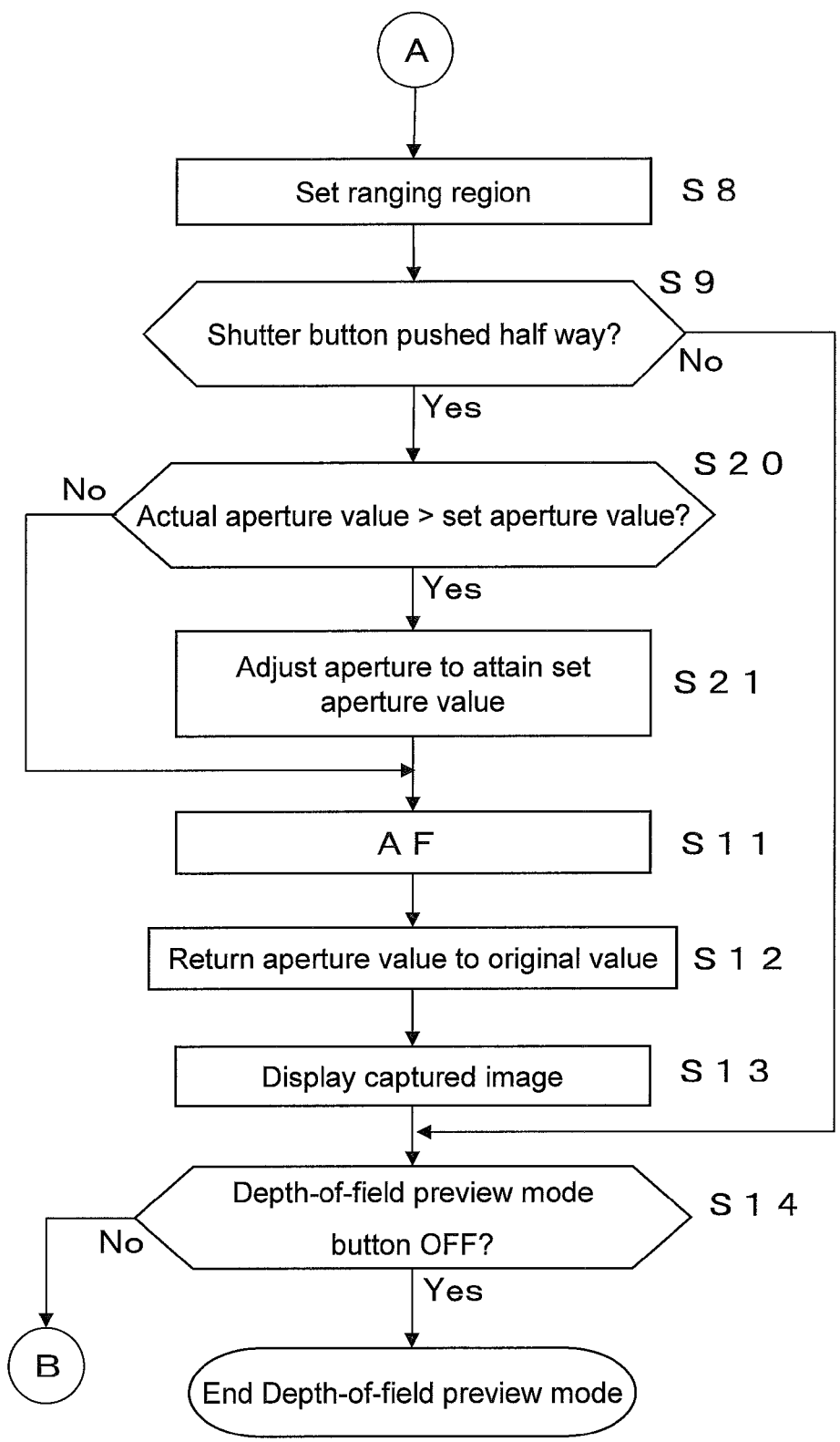
FIG. 13 is a flowchart of the depth-of-field preview mode (other embodiment).

Also, if the aperture value before focal point adjustment is smaller than the set aperture value, then focal point adjustment may be performed without changing the aperture value to the set aperture value. For example, as shown in FIG. 13, when the release button 30 is pushed down half way, the actual aperture value and the set aperture value are compared by the body microcomputer 12 (S20). If the actual aperture value is greater than the set aperture value, then the aperture is adjusted by the aperture adjuster 29 so that the aperture value of the optical system L will be the set aperture value (S21).

On the other hand, if the actual aperture value is the same as or less than the set aperture value, then focal point adjustment is commenced without adjusting the aperture (S11).

With the case shown in FIG. 13, since the aperture value before focal point adjustment is relatively small, the same effect as in the above-mentioned embodiment can be obtained.

Further, if the actual aperture value is greater than the set aperture value, the aperture may be adjusted so that the aperture value of the optical system L is smaller than the set aperture value (an aperture value set separately from the set aperture value). For example, in step S21, if the set aperture value is F4 and the actual aperture value is F8, the aperture may be adjusted so that the aperture value of the optical system L is the minimum value (such as F2).

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An imaging device for producing an image of a subject, comprising:
   an optical system configured to form an optical image of the subject;
   an image capturing unit configured to convert the optical image into an image signal;
   an aperture adjuster having an aperture included in the optical system and capable of adjusting a state of the aperture;
   a focal point adjuster including a focus lens disposed in the optical system and capable of adjusting a focal state of the optical system by using a contrast detection method; and
   a controller configured to control the aperture adjuster so that an aperture value of the optical system will be no greater than a preset aperture value set before the focal state is adjusted by the focal point adjuster.

2. The imaging device according to claim 1, wherein, in case that the aperture value of the optical system was changed from a first aperture value to the preset aperture value, the controller is configured to control an operation of the aperture adjuster so that after the adjustment of the focal state by the focal point adjuster, the aperture value of the optical system returns to the first aperture value.

3. The imaging device according to claim 2, wherein the controller is configured to control the operation of the aperture adjuster so that the first aperture value is compared with the preset aperture value set before the focal state is adjusted by the focal point adjuster, and if the first aperture value is greater than the preset aperture value, the aperture value of the optical system will be no greater than the preset aperture value.

4. The imaging device according to claim 3, wherein the preset aperture value is the minimum aperture value for the optical system.

5. The imaging device according to claim 4, further comprising:
   a focal point adjustment operating unit configured to receive an input of focal point adjustment information for starting a focal point adjustment,
   wherein the controller is configured to start control of the operation of the focal point adjuster so that the aperture value of the optical system will be no greater than the preset aperture value on a basis of the focal point adjustment information inputted to the focal point adjustment operating unit.

6. The imaging device according to claim 5, further comprising:
   a display unit configured to display an image of the subject on a basis of the image signal; and
   a mode operating unit configured to receive an input of mode information for starting a depth-of-field preview mode which is a mode in which the state of the aperture can be adjusted while the image is displayed on the display unit,
   wherein the focal point adjuster is configured to start adjusting the focal state on a basis of the mode information inputted to the mode operating unit.

7. The imaging device according to claim 1, wherein the preset aperture value is a minimum aperture value for the optical system.

8. The imaging device according to claim 7, further comprising:
   a focal point adjustment operating unit configured to receive an input of focal point adjustment information for starting a focal point adjustment,
   wherein the controller is configured to start control of the operation of the focal point adjuster so that the aperture value of the optical system will be no greater than the preset aperture value on a basis of the focal point adjustment information inputted to the focal point adjustment operating unit.

9. The imaging device according to claim 8, further comprising:
   a display unit configured to display an image of the subject on a basis of the image signal; and
   a mode operating unit configured to receive an input of mode information for starting a depth-of-field preview mode which is a mode in which the state of the aperture can be adjusted while the image is displayed on the display unit,
   wherein the focal point adjuster is configured to start adjusting the focal state on a basis of the mode information inputted to the mode operating unit.

10. The imaging device according to claim 2, wherein the preset aperture value is a minimum aperture value for the optical system.

11. The imaging device according to claim 10, further comprising:
    a focal point adjustment operating unit configured to receive an input of focal point adjustment information for starting a focal point adjustment,
    wherein the controller is configured to start control of the operation of the focal point adjuster so that the aperture value of the optical system will be no greater than the preset aperture value on a basis of the focal point adjustment information inputted to the focal point adjustment operating unit.

12. The imaging device according to claim 11, further comprising:
a display unit configured to display an image of the subject on a basis of the image signal; and
a mode operating unit configured to receive an input of mode information for starting a depth-of-field preview mode which is a mode in which the state of the aperture can be adjusted while the image is displayed on the display unit,
wherein the focal point adjuster is configured to start adjusting the focal state on a basis of the mode information inputted to the mode operating unit.

13. The imaging device according to claim 1, further comprising:
a focal point adjustment operating unit configured to receive an input of focal point adjustment information for starting a focal point adjustment,
wherein the controller starts control of the operation of the focal point adjuster so that the aperture value of the optical system will be no greater than the preset aperture value on a basis of the focal point adjustment information inputted to the focal point adjustment operating unit.

14. The imaging device according to claim 13, further comprising:
a display unit configured to display an image of the subject on a basis of the image signal; and
a mode operating unit configured to receive an input of mode information for starting a depth-of-field preview mode which is a mode in which the state of the aperture can be adjusted while the image is displayed on the display unit,
wherein the focal point adjuster starts adjusting the focal state on a basis of the mode information inputted to the mode operating unit.

15. The imaging device according to claim 2, further comprising:
a focal point adjustment operating unit configured to receive an input of focal point adjustment information for starting focal point adjustment,
wherein the controller is configured to start control of the operation of the focal point adjuster so that the aperture value of the optical system will be no greater than the preset aperture value on a basis of the focal point adjustment information inputted to the focal point adjustment operating unit.

16. The imaging device according to claim 15, further comprising:
a display unit configured to display an image of the subject on a basis of the image signal; and
a mode operating unit configured to receive an input of mode information for starting a depth-of-field preview mode, which is a mode in which the state of the aperture can be adjusted while the image is displayed on the display unit,
wherein the focal point adjuster is configured to start adjusting the focal state on a basis of the mode information inputted to the mode operating unit.

17. The imaging device according to claim 3, further comprising:
a focal point adjustment operating unit configured to receive an input of focal point adjustment information for starting a focal point adjustment,
wherein the controller is configured to start control of the operation of the focal point adjuster so that the aperture value of the optical system will be no greater than the preset aperture value on a basis of the focal point adjustment information inputted to the focal point adjustment operating unit.

18. The imaging device according to claim 17, further comprising:
a display unit configured to display an image of the subject on a basis of the image signal; and
a mode operating unit configured to receive an input of mode information for starting a depth-of-field preview mode which is a mode in which the state of the aperture can be adjusted while the image is displayed on the display unit,
wherein the focal point adjuster is configured to start adjusting the focal state on a basis of the mode information inputted to the mode operating unit.

19. The imaging device according to claim 1, further comprising:
a display unit configured to display an image of the subject on a basis of the image signal; and
a mode operating unit configured to receive an input of mode information for starting a depth-of-field preview mode which is a mode in which the state of the aperture can be adjusted while the image is displayed on the display unit,
wherein the focal point adjuster is configured to start adjusting the focal state on a basis of the mode information inputted to the mode operating unit.

* * * * *